Patented July 13, 1937

2,086,831

UNITED STATES PATENT OFFICE 2,086,831

ANTHRAQUINONE VAT DYE POWDERS AND THEIR PREPARATION

Walter S. Tolman, Buffalo, N. Y., assignor to National Aniline and Chemical Company, Inc., New York, N. Y., a corporation of New York No Drawing. Application April 5, 1935
Serial No. 14,953

8 Claims. (Cl. 8—6)

This invention relates to new anthraquinone vat dye powder compositions, and to their preparation.

Anthraquinone vat dyes are frequently prepared in the form of a paste for shipment, but because of the weight of the liquid constituents of the paste, which adds to the cost of shipping, and the tendency of the paste to dry out when the container is opened, it is more advantageous to prepare the dyestuff in the form of a powder. However, when anthraquinone vat dyes have been dried, they are wetted by and dispersed in water with great difficulty, and do not produce the stable dispersions which are essential for uniform dyeing and printing.

The qualities of being dispersed readily and "wetted" quickly in water are not restored to such dry vat dyes by grinding them to fine powder; and hitherto, the addition or admixture of dispersing and/or wetting agents to such dyes before or after drying, and even after fine grinding has been unsatisfactory since this procedure has not been, in most cases, successful in causing the dyestuffs to acquire or regain fully the dispersing or "wetting" properties which they ordinarily possess when in paste form. Such preparations of powdered anthraquinone vat dyes, when added to water, are not converted to a uniform paste except with great difficulty and after long and vigorous agitation. A lumpy paste results in incomplete reduction when the dye is added to the "vat", or in a longer time for the reduction to take place, and either of these conditions is disadvantageous. Further, in order to yield satisfactory results a paste prepared from an anthraquinone vat dyestuff powder should be stable, i. e., should not settle on long standing. Powders which do not disperse or become wetted rapidly in water, or result in lumpy or unstable pastes, produce, when used in printing preparations and processes, specky, weak, and non-uniform prints; such powders are, therefore, useless for printing purposes. The generally unsatisfactory nature of anthraquinone vat dye powders, particularly for printing preparations and processes, is evidenced by the relatively inconsiderable number and quantity of powders, as compared with that of pastes, marketed for printing purposes.

The present invention has for its object the production of improved anthraquinone dye powder compositions which become wetted readily in water or in a "vat", and disperse quickly and satisfactorily to form stable pastes or dispersions which can be applied in dyeing and printing preparations and processes, the said powders thus becoming complete and satisfactory substitutes for the anthraquinone vat dye pastes as now marketed.

According to the present invention, new dye powder compositions are produced by incorporating a salt or salts, soluble in water, and derived from one or more individual or mixed aminoaliphatic carboxylic acids or substituted aminoaliphatic carboxylic acids, with an anthraquinone vat dyestuff in the form of a paste and evaporating the mixture to dryness. The dry residue may be converted to a uniform powder by grinding or by any other suitable method.

Compounds suitable for use in accordance with this invention are the salts of amino-carboxylic acids represented by the general formula:

wherein B represents H, methyl, or phenyl, and M is sodium, potassium, or ammonium. The products which are especially preferred are the alkali-metal and ammonium salts of phenylglycine or phenyl-amino-acetic acid—

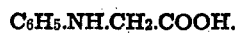

The amino-carboxylic acid salt in the present invention appears to prevent formation of strongly adherent flocks or aggregates and hence makes possible fine dispersion of the resulting dye. It is possible that upon carrying out the process of the invention, the amino-carboxylic acid forms a protective coating over the individual dye particles, which produces in agglomerated particles cleavage surfaces of low resistance to wetting.

The anthraquinone vat dye powders of the present invention preferably contain in addition to the anthraquinone dyestuff and the amino-carboxylic acid or derivative thereof one or more dispersing agents. The use of a dispersing agent accelerates the thorough wetting of the dye powder in water and coacts with the amino-carboxylic acid to yield a smooth, uniform, finely divided dispersion in aqueous media. Although the amino-carboxylic acid is added to the dyestuff while the latter is in finely dispersed condition, for example in the form of a paste obtained by precipitation of the dyestuff from solution, the dispersing agent may be incorporated merely by any suitable method of admixture with the dye powder. In order to secure a maximum uniformity of pastes prepared from such dye powders, it is preferable, however, to introduce the dispersing agent at the same time that the dye is mixed with the amino-carboxylic acid salt, i. e., while the dye is in finely dispersed form.

As suitable dispersing agents which may be used in accordance with the present invention are the polynuclear aromatic sulfonic acids; the sulfonic acids of nuclear alkyl-, aralkyl-, cycloalkyl-, hydroxyalkyl-, alkoxy-, and alkylamino-substituted derivatives of mono- or poly-nuclear aromatic compounds such as benzene, phenol, naphthalene, or naphthol; the formaldehyde condensation products of the above enumerated aromatic sulfonic acids; the alkyl sulfates and sulfuric acid esters, etc.

As examples of suitable dispersing agents which may be incorporated as individuals or as mixtures may be mentioned the formaldehyde condensation product of naphthalene sulfonic acid known in the trade as Leukanol, mono- and di-isopropyl-naphthalene sulfonic acids, mono- and di-isobutyl-naphthalene sulfonic acids, cetyl-phenol sulfonic acids, tetradecyl-phenol sulfonic acids, sodium cetyl sulfate, sodium isobutyl sulfate, diamylbenzene sulfonic acid, etc.

Other distributing and reducing agents as components of the anthraquinone vat dye powder compositions may be added, as for example, soluble starch, dextrine, alkali starch, granulated or powdered sugar, etc. These may be admixed, preferably as solutions, with the dye paste prior to drying thereof to form the dye powders of the present invention.

The dry vat dye powder compositions may be reduced to standard strength by incorporating suitable diluents, for example, powdered sugar, soluble starch, dextrine, etc., with the finely ground dye powder in the usual manner, as for example, grinding the dry dye and the diluent in a mill, or grinding and/or mixing them in a ball mill.

The following examples illustrate, but do not limit, the invention. Quantities are expressed as parts by weight unless otherwise designated.

*Example 1.*—850 parts of Carbanthrene Blue GCD paste (Color Index No. 1113) containing 18 per cent solids were added to an aqueous mixture of 425 parts sodium isobutyl sulfate, 230 parts potassium salt of phenyl glycine, and 565 parts water. The mixture was evaporated while agitated at between 80° and 90° C., and was finally dried. The dry material was ground to pass a 60 mesh screen and diluted to 18 per cent dye solids by addition of sugar.

The blue powder so obtained is a satisfactory substitute for the paste in all dyeing and printing preparations. It disperses and wets with extreme rapidity, and yields when applied in printing pastes, even dyeings of full strength free from specks.

*Example 2.*—A quantity of approximately 10.2 per cent paste of Carbanthrene Blue RS (Color Index No. 1106) containing 51.0 parts of dye solids, was mixed with 4.5 parts of Leukanol and diluted with water to 500 parts.

450 parts of this paste were mixed with a solution of 225 parts sodium isobutyl sulfate in 580 parts of water, and 175 parts of the potassium salt of phenyl glycine. The mixture was evaporated to dryness and ground to pass through a 60 mesh screen. It may be reduced to desired strength by addition of sugar or soluble dextrine as in Example 1.

The powder thus obtained has exceptionally rapid dispersing qualities in aqueous solutions and wets very rapidly. It is an excellent substitute for the paste in dyeing and printing preparations and processes.

*Example 3.*—50 parts of paste (17 per cent solids) of Carbanthrene Blue DR (Color Index No. 1099) were mixed with a solution of 25 parts of sodium isobutyl sulfate in 64 parts of water, 10 parts of the potassium salt of phenyl glycine, 5 parts sugar, and 1.5 parts Leukanol. The mixture was evaporated to dryness and the dry material ground to powder to pass a 60 mesh screen. The fine powder is an excellent substitute for the paste in dyeing and printing preparations and processes.

*Example 4.*—180 parts of Carbanthrene Blue GCD paste (Color Index No. 1113) containing 17.5 per cent dry dye and 2 per cent Leukanol were thoroughly mixed with 81 parts of glycine (sodium salt of amino acetic acid) and the whole was evaporated to dryness. The dry mixture was ground to pass a 60 mesh screen. The powder disperses quickly and is wetted rapidly in water. It yields dyeings which are equal to those derived from the original Carbanthrene Blue GCD paste. The same results are obtained if sarcosine is used instead of glycine.

*Example 5.*—In Example 4, 40 parts of the 81 parts of glycine were replaced by 40 parts of sodium lauryl sulfate. The dry powder disperses readily, wets out quickly, yields stable pastes and is as effective in dyeing preparations and processes as the Carbanthrene Blue GCD paste from which it was made.

I claim:

1. In the preparation of an anthraquinone vat dye powder, the improvement which comprises mixing an anthraquinone vat dye paste with a compound of the formula $BNHCH_2COOM$, wherein B represents H, methyl or phenyl and M represents Na, K, or $NH_4$, and evaporating the mixture to dryness.

2. In the preparation of an anthraquinone vat dye powder, the improvement which comprises mixing an anthraquinone vat dye paste with a phenylamino acetate of sodium, potassium or ammonium, and evaporating the mixture to dryness.

3. In the preparation of an anthraquinone vat dye powder, the improvement which comprises mixing an anthraquinone vat dye paste with a dispersing agent and a phenylamino acetate of sodium, potassium, or ammonium, and evaporating the mixture to dryness.

4. In the preparation of an anthraquinone vat dye powder, the improvement which comprises mixing an anthraquinone vat dye paste, obtained by precipitation of the dyestuff from solution, with a compound of the formula $BNHCH_2COOM$ wherein B represents H, methyl, or phenyl and M represents Na, K, or $NH_4$ and evaporating the mixture to dryness.

5. In the preparation of an anthraquinone vat dye powder, the improvement which comprises mixing an anthraquinone vat dye paste, obtained by precipitation of the dyestuff from solution, with the sodium salt of phenylamino acetic acid and a dispersing agent, and evaporating the mixture to dryness.

6. An anthraquinone vat dye powder comprising an anthraquinone vat dye substantially homogeneously commingled with the phenylamino acetate of sodium, potassium, or ammonium.

7. An anthraquinone vat dye powder comprising a dispersing agent and an anthraquinone vat dye substantially homogeneously commingled with a phenylamino-acetate of sodium, potassium, or ammonium.

8. An anthraquinone vat dye powder comprising a substantially homogeneous mixture of a finely divided anthraquinone vat dye, a dispersing agent, and the sodium salt of phenylamino-acetic acid.

WALTER S. TOLMAN.